United States Patent
Kwon

(10) Patent No.: US 9,079,610 B2
(45) Date of Patent: Jul. 14, 2015

(54) TELESCOPIC DEVICE OF STEERING COLUMN FOR VEHICLE

(71) Applicant: MANDO Corporation, Pyeongtaek-si, Gyeonggi-do (KR)

(72) Inventor: Hyun Bi Kwon, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/228,464

(22) Filed: Mar. 28, 2014

(65) Prior Publication Data

US 2014/0290424 A1 Oct. 2, 2014

(30) Foreign Application Priority Data

Mar. 29, 2013 (KR) ........................ 10-2013-0034340

(51) Int. Cl.
*B62D 1/184* (2006.01)
*B62D 1/185* (2006.01)
*B62D 1/189* (2006.01)
*B62D 1/187* (2006.01)

(52) U.S. Cl.
CPC ................ *B62D 1/184* (2013.01); *B62D 1/185* (2013.01); *B62D 1/187* (2013.01); *B62D 1/189* (2013.01)

(58) Field of Classification Search
CPC ........ B62D 1/184; B62D 1/185; B62D 1/187; B62D 1/189; B62D 1/18
USPC ............................................ 74/493; 280/775
See application file for complete search history.

(56) References Cited

U.S. PATENT DOCUMENTS

| 8,037,782 B2 | 10/2011 | Uesaka | |
|---|---|---|---|
| 2006/0169089 A1* | 8/2006 | Ohtsu | 74/493 |
| 2010/0139439 A1* | 6/2010 | Uesaka | 74/493 |
| 2011/0088501 A1* | 4/2011 | Park | 74/493 |

FOREIGN PATENT DOCUMENTS

| JP | 2007038833 | 2/2007 |
|---|---|---|
| JP | 2010-083227 A | 4/2010 |
| JP | 2013047025 | 3/2013 |
| KR | 1020110004943 A | 1/2011 |
| KR | 101131809 B1 | 3/2012 |
| KR | 2013001243 A | 1/2013 |

OTHER PUBLICATIONS

Korean official action dated May 28, 2014 of the corresponding Korean Application No. 10-2013-0034340.
Korean Notice of Allowance for application No. 10-2013-0034340 dated Feb. 12, 2015, citing the above reference(s).

* cited by examiner

*Primary Examiner* — Keith Frisby
(74) *Attorney, Agent, or Firm* — Lowe Hauptman & Ham, LLP

(57) ABSTRACT

A telescopic device of a steering column for a vehicle includes an internal tube (200) connected to a vehicle body and formed in a lengthwise direction, a telescopic bush (250) provided around the internal tube (200) and having a fixing hole (252), through which a tilt bolt (300) of a tilt device enabling a steering column to have a tilt motion passes, so as to fix the tilt bolt (300), and an external tube (100) provided to enclose an outer side of the internal tube (200) and to move in a telescopic motion in the lengthwise direction of the internal tube (200) and having a guide hole (120) formed in the lengthwise direction so that the telescopic bush (250) is inserted therein and protrudes.

5 Claims, 6 Drawing Sheets

TELESCOPIC DEVICE OF STEERING COLUMN FOR VEHICLE

CROSS-REFERENCE TO RELATED APPLICATION

This application claims priority to and the benefit of Korean Patent Application No. 10-2013-0034340, filed on Mar. 29, 2013, the disclosure of which is incorporated herein by reference in its entirety.

BACKGROUND

1. Field of the Invention

The present invention relates to a telescopic device of a steering column for a vehicle, which adapts the steering column for the vehicle to have a telescopic motion, and more particularly, to a telescopic device of a steering column for a vehicle, in which a telescopic bush is provided at an internal tube.

2. Discussion of Related Art

A steering apparatus which allows a driver to change a vehicle's moving direction to a desired direction includes a steering shaft which allows a rotational force generated from a steering wheel to be transmitted to a gear box and a tie rod.

Generally, the steering shaft enables transmission of the rotational force and axial expansion and contraction even in a state in which the steering shaft is inclined at a predetermined angle. A steering column which supports the steering shaft and also fixes the steering shaft to a vehicle body is installed at an outer circumferential surface of the steering shaft.

Particularly, the steering column includes a tilt device and a telescopic device which enable a position of the steering wheel to be adjusted according to a driver's body condition. The telescopic device serves to allow the steering shaft to be slid in a lengthwise direction and thus to enable the steering column to be adjusted in the lengthwise direction.

FIG. 1 illustrates a conventional telescopic device. Referring to the drawing, in the telescoping device, an external tube 20 is formed on an outer side of an internal tube 10 to be moved forward and backward in a lengthwise direction. At this time, a tilt bolt 30 of a tilt device is provided to pass through a through-hole 22 formed in both sides of the external tube 20.

Therefore, the external tube 20 may be moved by a front and rear length of the through-hole 22, and organically connected with the tilt device.

However, in the conventional telescopic device, friction may occur between the tilt bolt 30 and an inner surface of the through-hole 22 of the external tube 20. Therefore, a noise may be generated by the friction between the tilt bolt 30 and the inner surface of the through-hole 22, and also components may be rapidly worn.

Meanwhile, in order to prevent the physical wear of the device, an elastic telescopic bush 25 was provided at the inner surface of the through-hole 22 of the external tube 20. However, since the friction was more increased due to the elastic material, the telescopic bush 25 itself was rapidly worn, and thus a repair work was frequently required.

Therefore, a new method to overcome these problems is required.

PRIOR ART DOCUMENTS

Patent Documents

Patent document 1: Korean Patent No. 10-1131809
Patent document 2: Japanese Patent Publication No. 2013-047025
Patent document 3: Japanese Patent Publication No. 2007-038833
Patent document 4: U.S. Pat. No. 8,037,782

SUMMARY OF THE INVENTION

The present invention is directed to a telescopic device of a steering column for a vehicle, which minimizes occurrence of friction between a tilt bolt and an external tube.

Also, the present invention is directed to a telescopic device of a steering column for a vehicle, which reduces the number of entire components in the telescopic device.

Additional aspects of the invention will be set forth in part in the description which follows and, in part, will be obvious from the description, or may be learned by practice of the invention.

According to an aspect of the present invention, there is provided a telescopic device of a steering column for a vehicle including an internal tube 200 connected to a vehicle body and formed in a lengthwise direction, a telescopic bush 250 provided around the internal tube 200 and having a fixing hole 252, through which a tilt bolt 300 of a tilt device enabling a steering column to have a tilt motion passes, so as to fix the tilt bolt 300, and an external tube 100 provided to enclose an outer side of the internal tube 200 and to move in a telescopic motion in the lengthwise direction of the internal tube 200 and having a guide hole 120 formed in the lengthwise direction so that the telescopic bush 250 is inserted therein and protrudes.

In the external tube 100, a through-hole 110 through which the tilt bolt 300 passes so as to guide a moving range of the external tube 100 may be formed at both sides of the guide hole 120, and the telescopic bush 250 may fix the tilt bolt 300 in a predetermined height so that the tilt bolt 300 is not in contact with an inner surface of the through-hole 110.

An upper portion of the fixing hole 252 of the telescopic bush 250 may be formed to be open.

A connection part 256 fixed to the internal tube 200 may be formed at a lower portion of the telescopic bush 250.

A front and rear directional cross section of the connection part 256 may be in multi-point contact with the internal tube 200.

A right and left directional cross-sectional curvature of the connection part 256 may be formed to be the same as a curvature of the internal tube 200.

A right and left directional cross-sectional curvature of the connection part 256 may be formed to be different from a curvature of the internal tube 200.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. In this specification, it is to be noted that a front and rear direction is defined as a lengthwise direction of an internal tube or an external tube, and a right and left direction is defined as a widthwise direction of the internal tube or the external tube.

Figure 1:
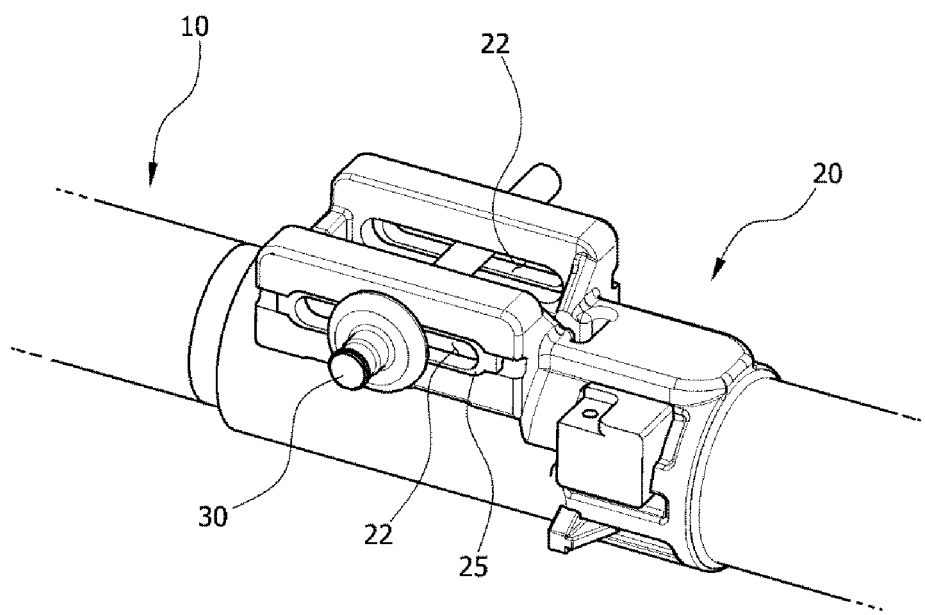
FIG. 1 is a perspective view of a telescopic device of a conventional steering column.
Figure 2:
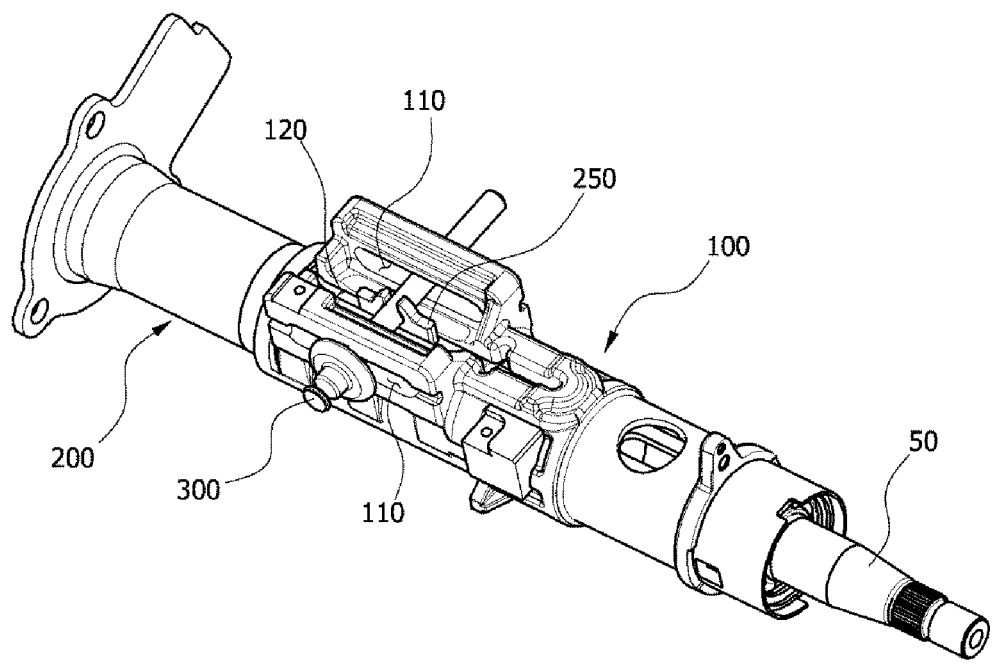
FIG. 2 is a perspective view of a telescopic device of a steering column for a vehicle in accordance with one embodiment of the present invention.
Figure 3:
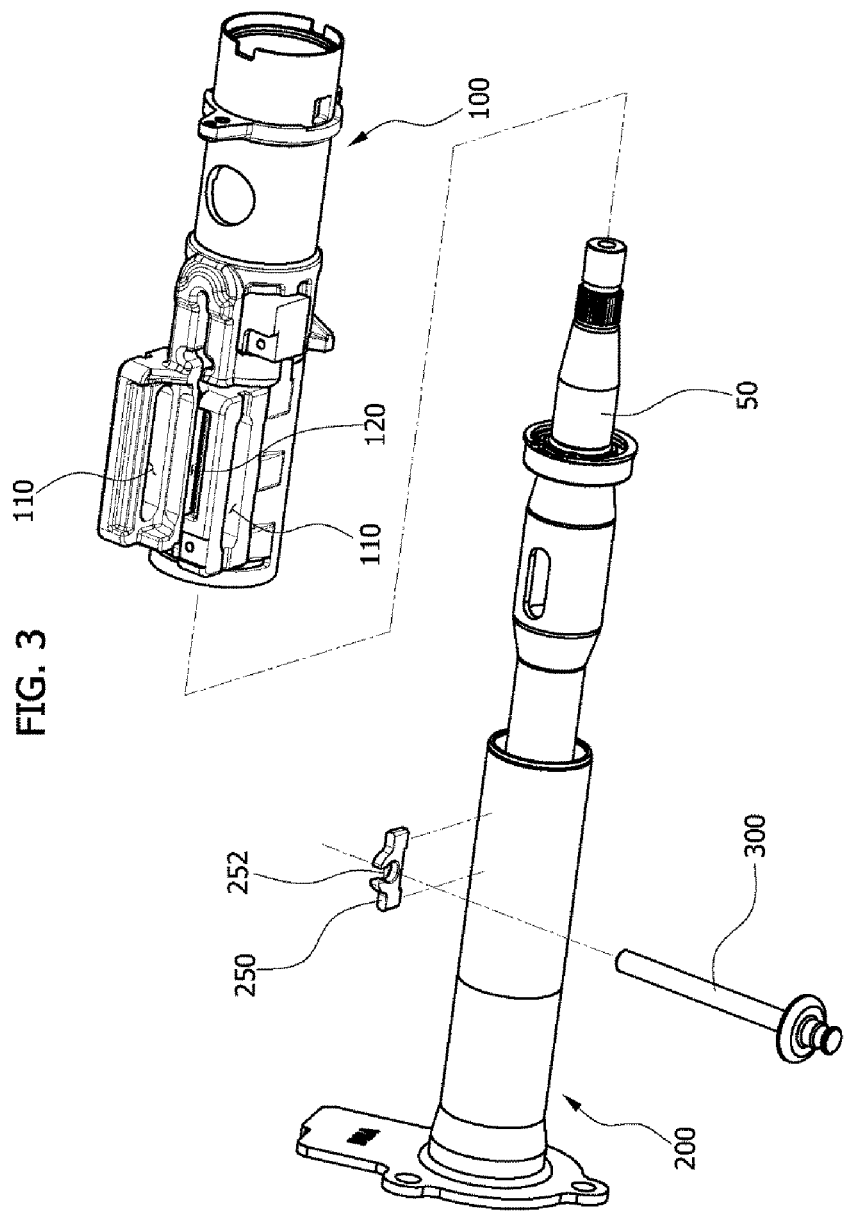
FIG. 3 is a perspective view illustrating a state in which construction elements are coupled with each other in the telescopic device of the steering column for the vehicle in accordance with the embodiment of the present invention.

FIG. 2 is a perspective view of a telescopic device of a steering column for a vehicle in accordance with one embodiment of the present invention, and FIG. 3 is a perspective view illustrating a state in which construction elements are coupled with each other in the telescopic device of the steering column for the vehicle in accordance with the embodiment of the present invention. Hereinafter, a structure of the telescopic device of the steering column for the vehicle in accordance with one embodiment of the present invention will be described fully with reference to FIGS. 2 and 3.

As illustrated in FIGS. 2 and 3, a telescopic device of a steering column for a vehicle in accordance with one embodiment of the present invention includes an internal tube 200, a telescopic bush 250, and an external tube 100.

The internal tube 200 is connected to a vehicle body, and formed to be elongated in a lengthwise direction. The internal tube 200 has a hollow in which a steering shaft 50 is inserted, and is provided to enclose the steering shaft 50. Since the steering shaft 50 is already obvious to a person skilled in the art, the description thereof will be omitted.

The telescopic bush 250 is provided around the internal tube 200. Also, a fixing hole 252 through which a tilt bolt 300 of a tilt device enabling a steering column to have a tilt motion passes is formed in the telescopic bush 250. A detailed description thereof will be shown below.

The external tube 100 is provided to be enclose an outer side of the internal tube 200 and also to move in a telescopic motion in a lengthwise direction of the internal tube 200, i.e., in a front and rear direction. That is, a user may adjust a wheel in the front and rear direction according to the telescopic motion of the external tube 100.

In the embodiment, the external tube 100 has a guide hole 120, and a through-hole 110 through which the tilt bolt 300 passes is formed in both sides of the guide hole 120. The telescopic bush 250 fixed to the internal tube 200 through the guide hole 120 is inserted so as to protrude to an outer side of the external tube 100. In this state, the tilt bolt 300 is inserted into the through-hole 110 and a fixing hole formed in the telescopic bush 250.

Figure 4:
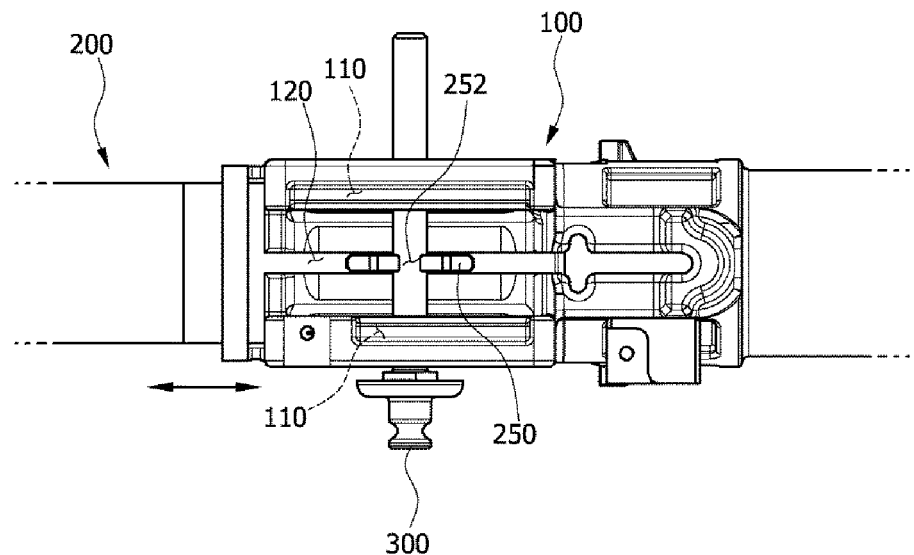
FIG. 4 is a plan view illustrating a state in which an external tube moves in a telescopic motion in the telescopic device of the steering column for the vehicle in accordance with the embodiment of the present invention.

FIG. 4 is a plan view illustrating a state in which the external tube 100 moves in a telescopic motion in the telescopic device of the steering column for the vehicle in accordance with the embodiment of the present invention.

As illustrated in FIG. 4, by coupling the above-mentioned construction elements, the external tube 100 moves in the telescopic motion in the lengthwise direction of the internal tube 200. At this time, the through-hole 110 through which the tilt bolt 300 passes is formed in both sides of the external tube 100, and thus a moving range of the external tube 100 is limited to a length of the through-hole 110. That is, the through-hole 110 may guide the moving range of the external tube 100.

Since the telescopic bush 250 is fixed to the internal tube 200, the telescopic bush 250 is maintained in a fixed state regardless of the motion of the external tube 100. Therefore, the telescopic bush 250 may have an effect of being relatively moved along the guide hole 120.

Figure 5:
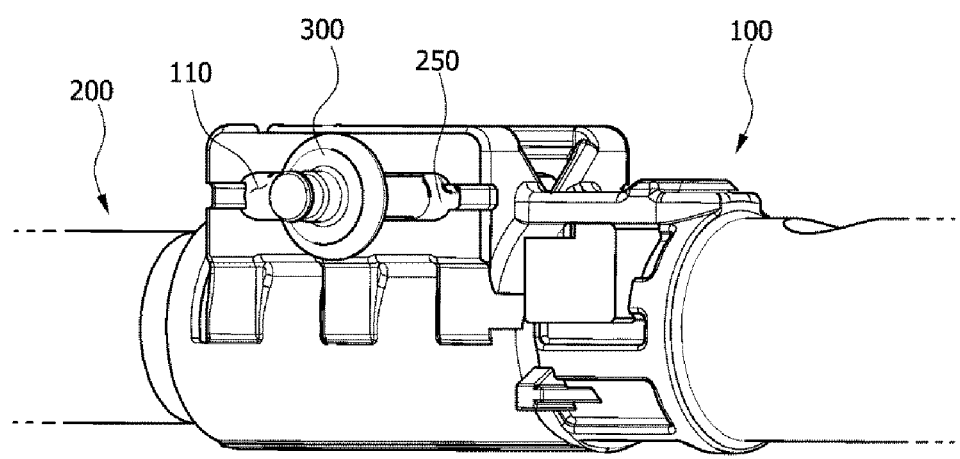
FIG. 5 is a perspective view illustrating the external tube seen from a lateral direction in the telescopic device of the steering column for the vehicle in accordance with the embodiment of the present invention.

FIG. 5 is a perspective view illustrating the external tube 100 seen from a lateral direction in the telescopic device of the steering column for the vehicle in accordance with the embodiment of the present invention.

As illustrated in FIG. 5, the telescopic bush 250 fixes the tilt bolt 300 so that the tilt bolt is maintained in a predetermined height, and thus the tilt bolt 300 is not in contact with an inner surface of the through-hole 110, but spaced apart from the inner surface of the through-hole 110.

As described in the field of the invention, in the conventional telescopic device, since the tilt bolt is in contact with the inner surface of the through-hole and thus the height of tilt bolt is maintained by the through-hole, a friction occurs between the inner surface of the through-hole and the tilt bolt when the external tube is moved forward and backward.

However, in the embodiment of the present invention, since the tilt bolt 300 is fixed by the telescopic bush 250, the tilt bolt 300 is spaced apart from the inner surface of the through-hole 110, and thus the friction due to the forward and backward movement of the external tube 100 may be minimized. Therefore, it is possible to minimize the noise and the wear between the components due to the telescopic motion.

Figure 6:
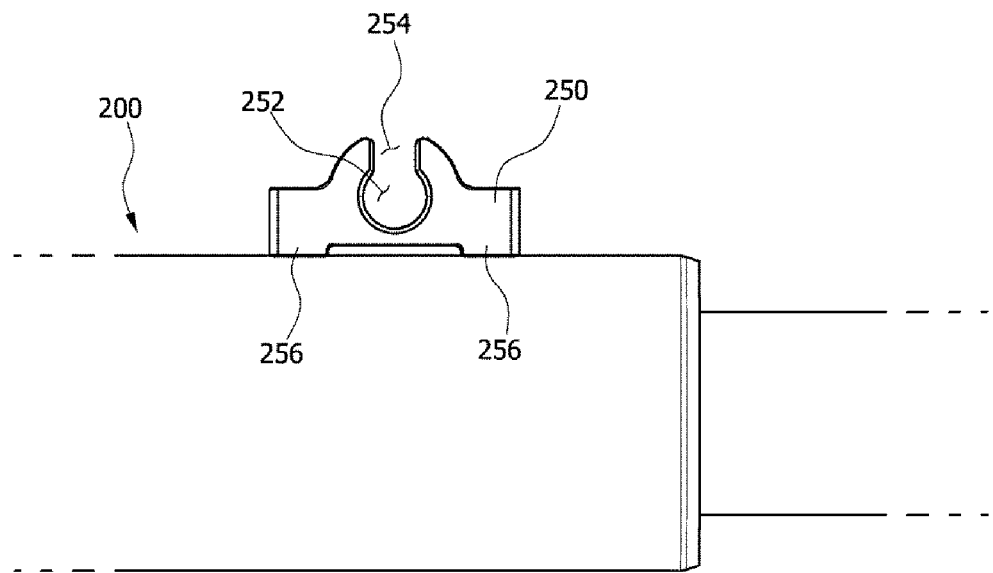
FIG. 6 is a side view illustrating a telescopic bush seen from a lateral direction in the telescopic device of the steering column for the vehicle in accordance with the embodiment of the present invention.

FIG. 6 is a side view illustrating the telescopic bush 250 seen from a lateral direction in the telescopic device of the steering column for the vehicle in accordance with the embodiment of the present invention.

As illustrated in FIG. 6, the telescopic bush 250 is provided at a predetermined position of the internal tube 200, and the fixing hole 252 for fixing the above-described tilt bolt is formed inside.

And in the embodiment, the telescopic bush 250 is formed so that an upper portion 254 of the fixing hole 252 is open. Particularly, since a width of the open upper portion 254 is formed to be smaller than a diameter of the fixing hole 252, the tilt bolt is not separated from the fixing hole 252, and thus is stably maintained in the fixed state.

Therefore, in a case that the telescopic bush 250 has a predetermined degree or more of elasticity, the tilt bolt may be inserted into the fixing hole 252 by applying external force from an outside of the telescopic bush 250. This is because the open upper portion 254 is instantaneously deformed so as to correspond to a width of the tilt bolt. Therefore, it is possible to more easily assemble the tilt bolt.

Meanwhile, in the embodiment, a connection part 256 which fixes the telescopic bush 250 itself to the internal tube 200 is formed at a lower portion of the telescopic bush 250. The connection part 256 may be connected to the internal tube 200 in various manners. Particularly, in the embodiment, a front and rear directional cross section of the connection part 256 is formed so that the telescopic bush 250 and the internal tube 200 are in two-point contact with each other.

As such, when the telescopic bush 250 and the internal tube 200 are in multi-point contact with each other, it is possible to effectively disperse a load of the tilt bolt, and also to easily keep a balance.

In the embodiment of the present invention, the telescopic bush 250 and the internal tube 200 are in two-point contact with each other, but this is just an example. The telescopic bush 250 and the internal tube 200 may be in three or more multi-point contact with each other. Alternatively, an entire lower surface of the telescopic bush 250 may be in linear contact with the internal tube 200.

Figure 7A:
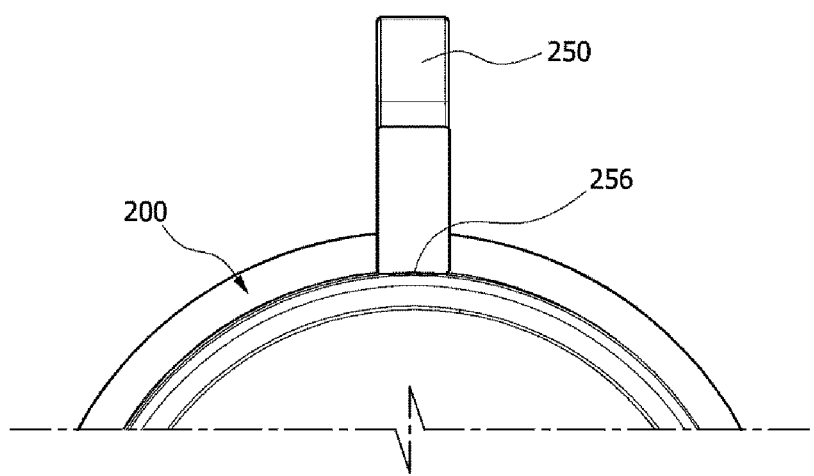
FIGS. 7A to 7C are front views illustrating various types of telescopic bush connection parts in the telescopic device of the steering column for the vehicle in accordance with the embodiment of the present invention.
Figure 7B:
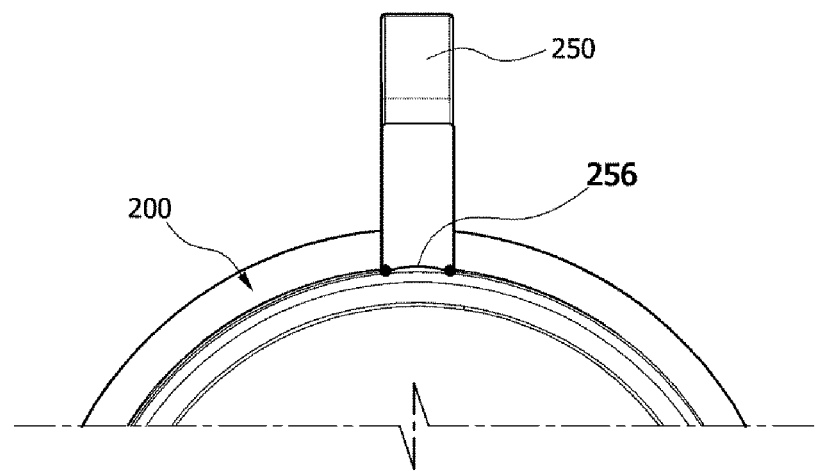
Figure 7C:
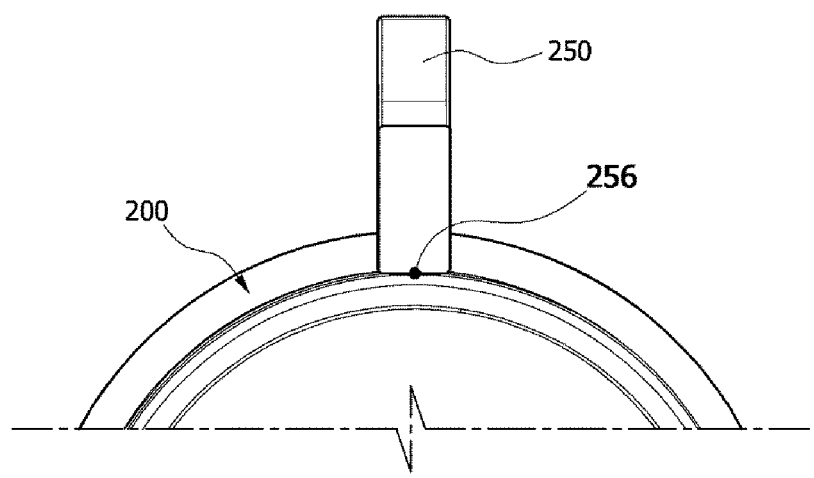

FIGS. 7A to 7C are front views illustrating various types of the connection parts 256 of the telescopic bush 250 in the telescopic device of the steering column for the vehicle in accordance with the embodiment of the present invention.

When the telescopic device of the steering column for the vehicle is seen from a front side, a right and left directional cross-sectional curvature of the connection part 256 of the telescopic bush 250 may be variously formed to correspond to a curvature of the internal tube 200.

As illustrate in FIG. 7A, when the right and left directional cross-sectional curvature of the connection part 256 of the telescopic bush 250 is the same as the curvature of the internal tube 200, the telescopic bush 250 and the internal tube 200 may be stably connected with each other over the entire surfaces thereof.

Further, as illustrated in FIG. 7B, when the right and left directional cross-sectional curvature of the connection part 256 of the telescopic bush 250 is formed to be smaller than the curvature of the internal tube 200, the telescopic bush 250 and the internal tube 200 are connected with each other through only one point of central portions thereof. Since a contact area between the telescopic bush 250 and the internal tube 200 is reduced, it is possible to reduce a cost for connecting the telescopic bush 250 and the internal tube 200, and also the above-described guide hole may be machined so as to have a narrower width.

Further, as illustrated in FIG. 7C, when the right and left directional cross-sectional curvature of the connection part 256 of the telescopic bush 250 is formed to be greater than the curvature of the internal tube 200, the telescopic bush 250 and the internal tube 200 are connected with each other through two points at both sides thereof. This provides more excellent load dispersing effect and thus improved durability, compared with the one-point contact.

Since the telescopic device of the steering column for the vehicle according to the present invention has a more rational structure, it is possible to minimize the friction between the tilt bolt and the external tube.

And since the telescopic bush is provided solely, it is possible to reduce the number of the entire components in the telescopic device, and thus to reduce the cost.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A telescopic device of a steering column for a vehicle, the telescopic device comprising:
    an internal tube connected to a vehicle body and formed in a lengthwise direction;
    a telescopic bush provided around the internal tube, and having a fixing hole, through which a tilt bolt of a tilt device enabling a steering column to have a tilt motion passes, so as to fix the tilt bolt; and
    an external tube provided to enclose an outer side of the internal tube and to move in a telescopic motion in the lengthwise direction of the internal tube, and having a guide hole formed in the lengthwise direction so that the telescopic bush is inserted therein and protrudes,
    wherein, in the external tube, a through-hole through which the tilt bolt passes so as to guide a moving range of the external tube is formed at both sides of the guide hole, and
    wherein the telescopic bush fixes the tilt bolt in a predetermined height so that the tilt bolt is not in contact with an inner surface of the through-hole.

2. The telescopic device of claim 1, wherein a connection part fixed to the internal tube is formed at a lower portion of the telescopic bush.

3. A telescopic device of a steering column for a vehicle, comprising:
    an internal tube connected to a vehicle body and formed in a lengthwise direction;
    a telescopic bush provided around the internal tube, and having a fixing hole, through which a tilt bolt of a tilt device enabling a steering column to have a tilt motion passes, so as to fix the tilt bolt; and
    an external tube provided to enclose an outer side of the internal tube and to move in a telescopic motion in the lengthwise direction of the internal tube, and having a guide hole formed in the lengthwise direction so that the telescopic bush is inserted therein and protrudes,
    wherein an upper portion of the fixing hole of the telescopic bush is formed to be open.

4. The telescopic device of claim 3, wherein a connection part fixed to the internal tube is formed at a lower portion of the telescopic bush.

5. A telescopic device of a steering column for a vehicle, comprising:
    an internal tube connected to a vehicle body and formed in a lengthwise direction;
    a telescopic bush provided around the internal tube, and having a fixing hole, through which a tilt bolt of a tilt device enabling a steering column to have a tilt motion passes, so as to fix the tilt bolt; and
    an external tube provided to enclose an outer side of the internal tube and to move in a telescopic motion in the lengthwise direction of the internal tube, and having a guide hole formed in the lengthwise direction so that the telescopic bush is inserted therein and protrudes,
    wherein a connection part fixed to the internal tube is formed at a lower portion of the telescopic bush,
    wherein a front and rear directional cross section of the connection part is in multi-point contact with the internal tube.

* * * * *